United States Patent [19]

Hunt et al.

[11] Patent Number: 4,740,114

[45] Date of Patent: Apr. 26, 1988

[54] JET STOWER

[75] Inventors: Noel Hunt; Michael J. F. Secretan, both of Ravenshead, England

[73] Assignee: Ansec Design and Engineering Limited, England

[21] Appl. No.: 904,351

[22] Filed: Sep. 5, 1986

[30] Foreign Application Priority Data

Sep. 26, 1985 [GB] United Kingdom ................. 8523780
Mar. 7, 1986 [GB] United Kingdom ................. 8605683

[51] Int. Cl.⁴ .............................................. B65G 53/58
[52] U.S. Cl. .................................... 406/139; 406/144; 406/113; 406/181
[58] Field of Search .............. 406/108, 145, 139, 144, 406/121, 122, 123, 181, 182, 183; 241/60

[56] References Cited

U.S. PATENT DOCUMENTS 614,501 11/1898 Randolph ............................ 241/60
2,462,542 2/1949 Paetow ............................... 241/60

FOREIGN PATENT DOCUMENTS

2117340 10/1983 United Kingdom ................ 406/122

Primary Examiner—Joseph F. Peters, Jr.
Assistant Examiner—James M. Kannofsky
Attorney, Agent, or Firm—Andrus, Sceales, Starke & Sawall

[57] ABSTRACT

A jet stower for use in handling material in mining comprises a casing having a material inlet and at least two outlets, the casing having an inlet for compressed air to be fed to one or more distribution chambers. The stower casing has an air accelerating unit fitted therein, the unit having at least one air chamber fitted with a nozzle upstream of a material inlet to the unit, across which the nozzle outlet is directed. In use, the unit can be positioned in the casing in any one of at least two alternative positions to direct material entrained in an accelerated air flow downstream of the nozzle outlet to a selected outlet so as to discharge it in a selected direction in the mine. The selected positioning of the unit can be carried out merely by removing the unit and reversing its position in the casing or by linearly or angularly moving it without removing it from the casing. In each selected position only one distribution chamber of the casing communicates with only one air chamber of the unit to produce the accelerated air flow in one direction to one outlet of the unit and casing.

21 Claims, 12 Drawing Sheets

JET STOWER

This invention relates to a jet stower, particularly, though not exclusively, for use in mining, especially in coal mines.

In one method of coal mining, a pair of spaced, parallel roadways are formed at approximately the level of a coal seam by the use of a plurality of inverted U-shaped arch supports. The two roadways are interconnected by a passage extending at 90° thereto and coal is mined by mining machines working in said passage and transported away by conveyors in said passage and said roadway.

For the mining of the coal to be continued, the whole process is necessarily advanced so as to move through the coal seam. In this process the coal is thus mined and the overlying rock is then allowed to collapse or cave behind the advance of the mining position. Thus the transverse passage is effectively advanced, still interconnecting the parallel roadways which are extended in length each time an advance is made.

However the extraction of the coal leaves a void which is not accounted for in the caving in process, and can lead to subsidence at ground level as a result. Moreover the corner junctions between the roadways and the transverse passage are weakened by this process and can cause problems as to the safety of the supported roadway.

Accordingly it has been proposed to extract rock and gangue from above or below the coal seam and to use it to form filler material to pack the collapsed rock, so as to fill the void created by the extracted coal, and thereby lessen or eliminate subsidence and strengthen the corner areas between the roadways and the transverse passage.

To accomplish this a jet stower has been proposed. This is a machine in which compressed air is fed through a venturi nozzle to create a laminar air flow in which the filler material, fed to the stower, can be entrained and thus transported by the air flow to an appropriate outlet.

It has however been found unsatisfactory, in use, for the jet stower to be able to direct material in one direction only. As space is normally severely restricted in its position of use in a mine, it is impossible to alter the direction of material delivery by turning round the jet stower. Accordingly an attempt has been made to solve this problem by providing the jet stower with two chambers, each containing a venturi nozzle, the two nozzles being arranged to produce laminar air flow in mutually opposite directions. In use, one of the nozzles is blanked off to prevent compressed air fed to the stower reaching it, while the other nozzle is utilised. If material delivery is required in the opposite direction, the procedure is reversed. However as well as it being necessary to blank off a selected nozzle, it is also necessary to move the stower so that filler material from a conveyor is deposited in the correct nozzle chamber. This movement can be troublesome to perform and may each time involve disconnection and connection of several pipes and fittings. Additionally the nozzles are at opposite sides of the jet stower, in order to provide oppositely directed air flows. This means that in order for it to be possible to blank either nozzle, access must be provided to both sides of the stower. In the confines already referred to, this can be a problem.

A further problem with the use of jet stowers occurs if the filler material contains oversize pieces, which could block the output opening of the stower.

The object of the invention is to provide an improved jet stower, which reduces or overcomes at least one of the disadvantages referred to above.

According to the invention a jet stower comprises a casing having a material inlet, fluid chamber means and a fluid inlet for supplying fluid to the fluid chamber means, a fluid accelerating unit positionable in a selected one of at least two alternative positions in the casing, the unit having a fluid inlet upstream of fluid accelerating means for receiving, in each of its alternative positions, fluid from the fluid chamber means and accelerating it by way of said fluid accelerating means, a material inlet of the unit being in communication, in use, with said material inlet of the casing in each alternative position of the unit, so that material passing through the material inlet of the casing can be entrained in said accelerated flow of fluid before passing through an outlet of the unit and an outlet of the casing, in a direction determined by the selected position of the unit in the casing.

Preferably a mineral breaker/sizer is disposed above said casing material inlet and material is passed through said sizer before entering the jet stower in order to prevent oversized material blocking the unit outlet.

The invention will now be described, by way of example, with reference to the accompanying drawings, in which.

Figure 1:
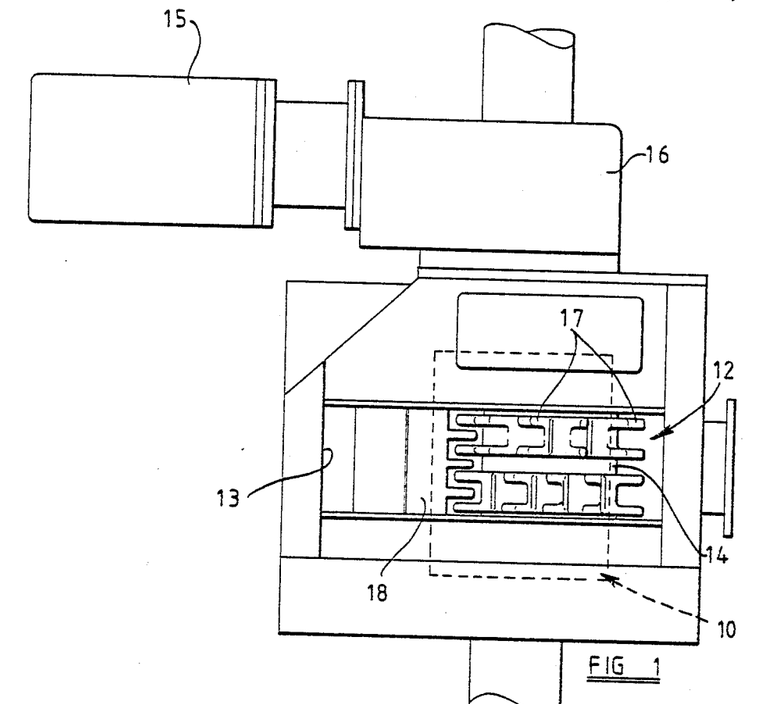
FIG. 1 is a top plan view of a first embodiment of a jet stower of the invention, fitted beneath a mineral sizer.
Figure 2:
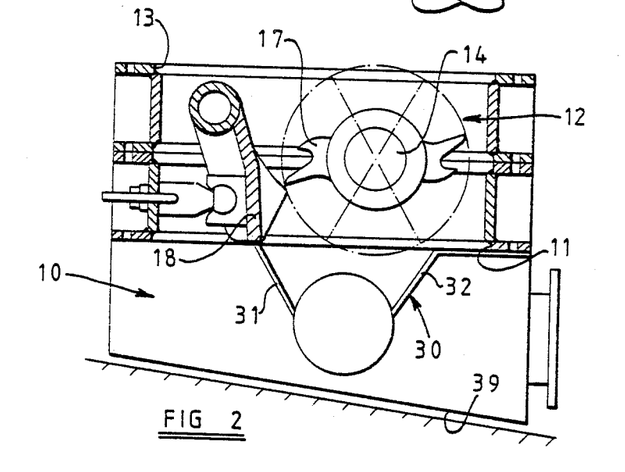
FIG. 2 is a schematic, sectional side view of the mineral sizer and jet stower of FIG. 1.

As shown in FIGS. 1 and 2, a jet stower 10 is connected to an outlet opening 11 in the bottom surface of a mineral sizer 12. The arrangement in the coal mine is such that the intended filler material is gathered by a conveyor associated with the advancing mining machine and fed into an inlet opening 13 of the mineral sizer.

The mineral sizer has a shaft 14 driven by a motor 15 through a gear box 16. A plurality of circumferentially spaced breaker teeth 17 are provided in two axially spaced rows around the shaft 14. At one side of the shaft 14 is provided an adjustable breaker plate 18. Material fed through the inlet opening 13 can thus be broken down to a smaller size as it passes between the breaker plate 18 and breaker teeth 17, before passing out of the sizer through the outlet opening 11.

The bottom surface of the sizer is flat and generally rectangular, and the sizer itself is normally bolted to the mining machine. The jet stower 10 is formed as a generally rectangular box-like casing 10a having a flat upper surface 19 on which the bottom surface of the sizer is secured, the surface 19 extending beyond two parallel sides 20, 21 of the stower and being of arcuate shape. The jet stower can be swivelled relative to the fixed sizer if required. The outlet opening 11 of the sizer is directly above an inlet opening 22 in the upper surface 19 of the stower. The opening 22 is formed between two bulkheads 22a, 22b having circular holes 22c, 22d therethrough, the two holes being co-axial and of the same radius.

At the side 21, the jet stower is open and connected thereto, in communication therewith is a compressed air feed passage 23 having a flanged inlet connection 24 at its end. The passage extends beyond the side 21, in a direction parallel thereto. Other suitable gaseous fluid could be used instead of air if required.

Figure 3:
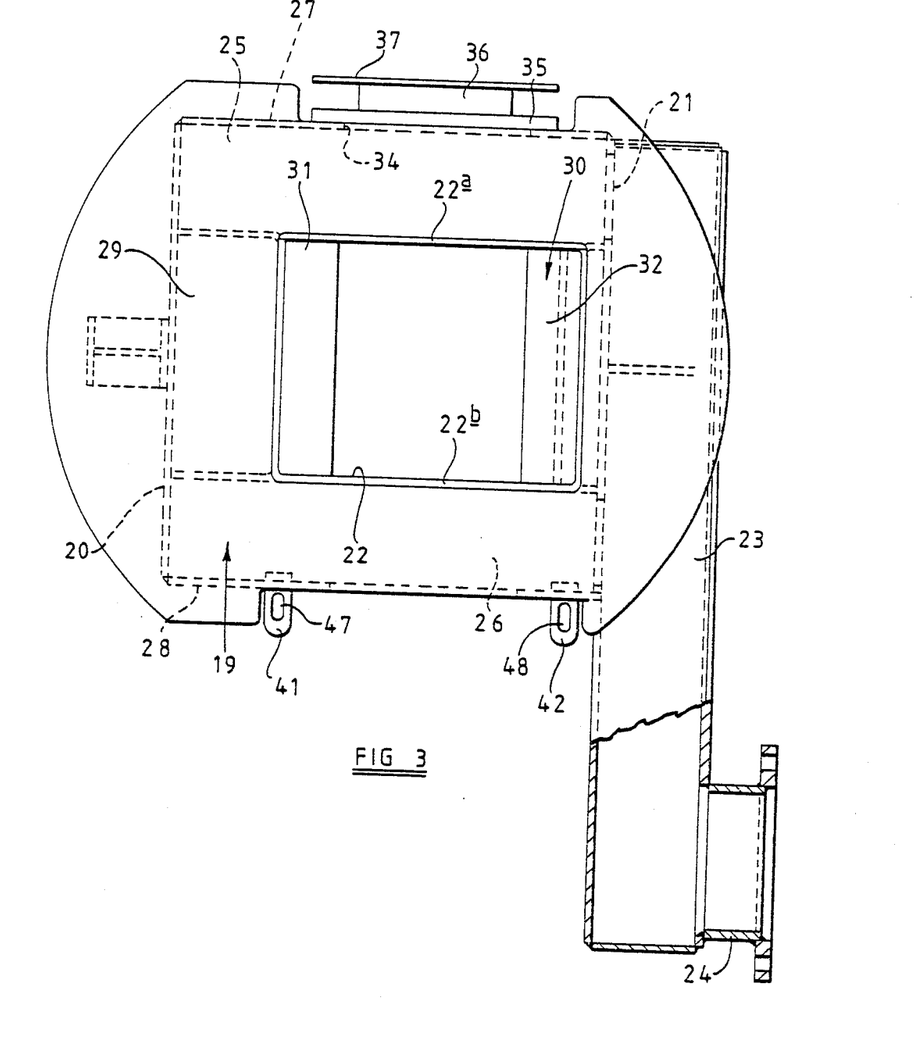
FIG. 3 is a top plan view of the jet stower, with a nozzle thereof not shown.
Figure 4:
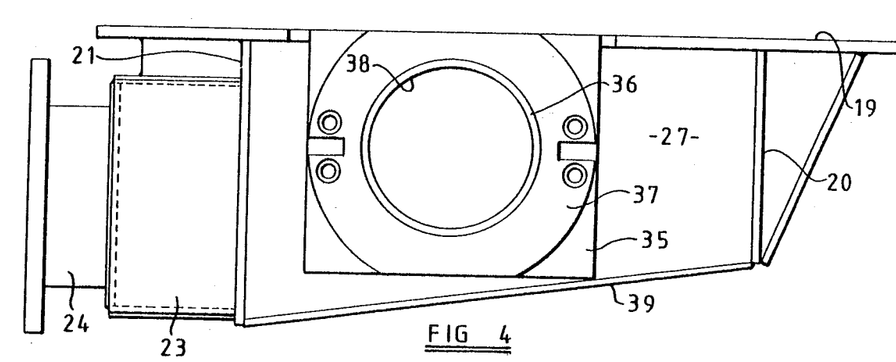
FIG. 4 is a view of one side of the jet stower.
Figure 5:
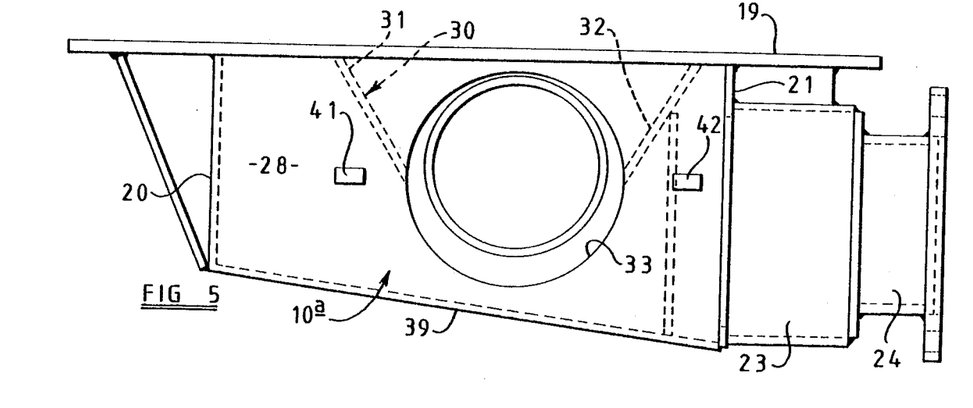
FIG. 5 is a view of the opposite side of the jet stower.

The interior of the casing is divided into two rectangular air chambers 25, 26 in communication with the passage 23, the chambers lying transverse to the sides 20, 21 along the respective other parallel sides 27, 28 of the casing, and the bulkheads 22a, 22b respectively. The chambers 25, 26 are interconnected by a further chamber 29 along the side 20.

Figure 6:
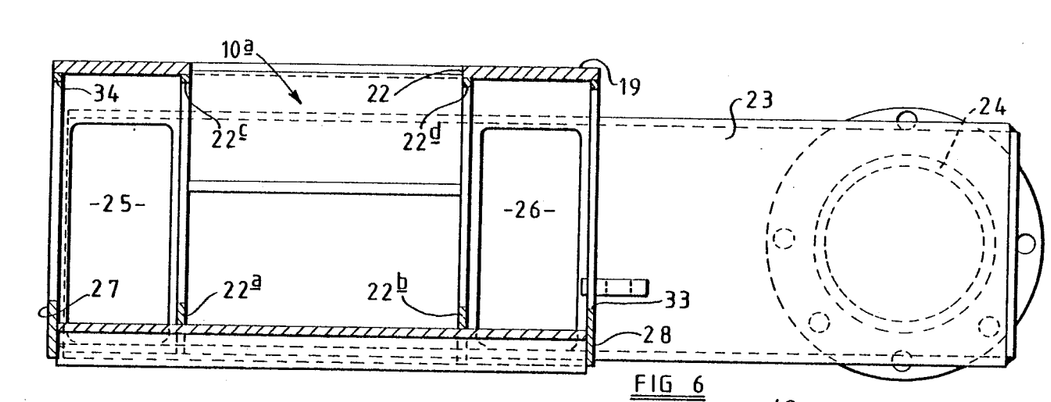
FIG. 6 is a cross-sectional view of part of the jet stower taken in a plane perpendicular to said sides thereof.

The part of the interior of the casing below the inlet opening 22 contains a support 30, formed by two spaced, downwardly converging straight sides 31, 32. The sides 31, 32 are secured at their upper, free ends to the underside of the surface 19 adjacent opposite, parallel sides of the opening 22.

Figure 9:
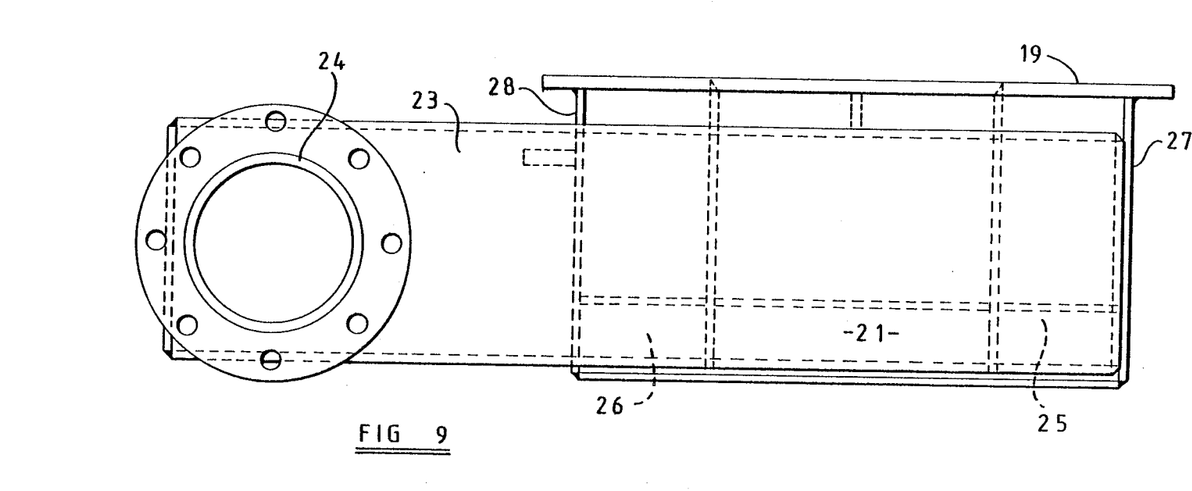
FIG. 9 is a view of an air-inlet side of the jet stower.

The side 27 of the casing has a circular opening 34 therein which leads to the chamber 25. To the outer surface of the side 27 is secured a flat, square plate 35 to cover the opening 34, the plate 35 having a central, circular hole in communication with the opening 34. From the hole in the plate 35, a short cylindrical tubular part 36 extends to an outer part-circular flange 37 with a central, circular hole 38, the flange lying parallel to the plate 35. This forms a connection for a material collection pipe as will be explained.

The opposite side 28 of the casing has a circular opening 33 therein communicating with the chamber 26. The opening 33 is co-axial with and of the same radius as the opening 34 in the side 27, and the holes 22c, 22d in the bulkheads (FIG. 6). A lower flat surface 39 slopes downwardly from the side 20 to the side 21 and forms the bottom of the jet stower casing. The opening 33 allows a fluid accelerating unit 40, to be described, to be inserted into the casing through said opening 33. At opposite sides of the opening 33, lugs 41, 42 respectively are secured to the side 28.

Figure 7:
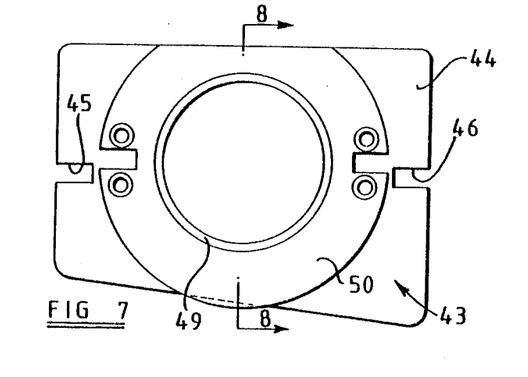
FIG. 7 is a side view of a detachable flange for fitting to the side shown in FIG. 5.
Figure 8:
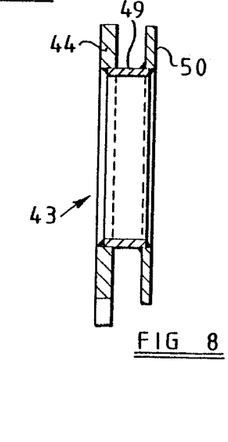
FIG. 8 is a cross-sectional view taken on the line of 8—8 of FIG. 7.

FIGS. 7 and 8 show an adaptor 43 which is intended to be removably fitted, as required, to the side 28, as will be described. The adaptor 43 is of similar form to the pipe connection described at the side 27, and comprises a generally rectangular, flat plate 44 of a size to cover the opening 33 in the side 28. At its opposite, shorter, vertical sides the plate has rectangular slots 45, 46 which in use, receive the lugs 41, 42 respectively to allow the plate to be received against the side 28. The lugs have respective holes 47, 48 and respective pegs (not shown) through these holes secure the plate 44 to the side 28. The lower side of the plate 44 is sloped to match the slope of the surface 39 at the bottom of the casing.

The plate 44 has a central, circular hole in the same way as the pipe connection at the side 27 and a similar cylindrical tubular part 49 connected to a part circular flange 50 for connection to a material collection pipe. In an alternative arrangement a second releasable adaptor 43 can be used at the opening 34 instead of the fixed plate 35, tubular part 36 and flange 37. This enables the unit 40 to be inserted into the casing at either of the sides 27, 28.

The fluid accelerating unit 40, referred to above, will now be described with reference to FIGS. 10 to 14.

Figure 15:
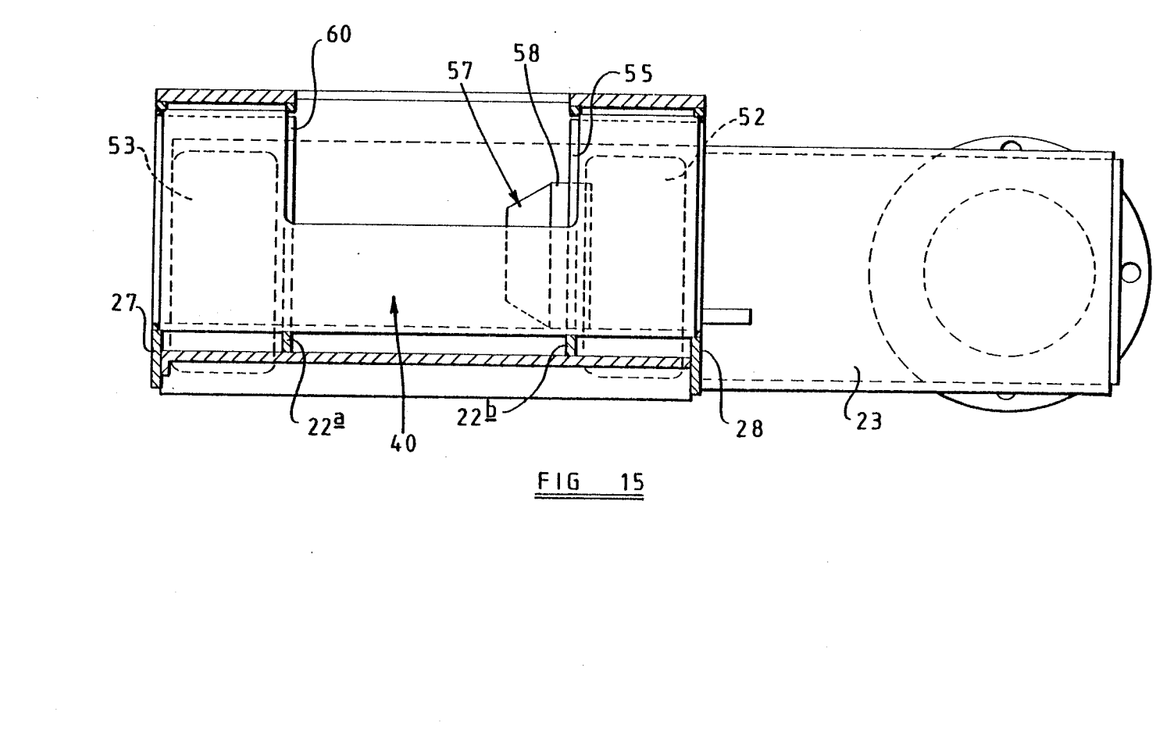
FIG. 15 is a view similar to FIG. 6 showing the venturi unit in one position in the stower casing.

The unit 40 comprises a hollow cylinder 51 of a length substantially equal to the distance between the exterior surfaces of the sides 27, 28 and of a radius such that when disposed in the stower casing the unit fits in the openings 33, 34 and holes 22c, 22d, and is supported by the sides 27, 28 and bulkheads 22a, 22b, (FIG. 15). The lower radiussed part of the unit matches the slopes of the sides 31, 32. A central semi-cylindrical portion of the cylinder 51 is cut-out therefrom, as best shown in FIG. 10, to leave hollow cylindrical chambers 52, 53 at respective opposite ends of the unit and an upwardly open semi-cylindrical channel between said chambers 52, 53.

Figure 13:
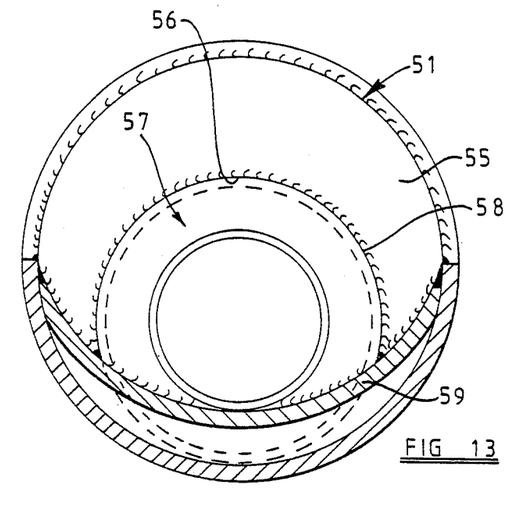
FIG. 13 is a sectional view on the line 13—13 of FIG. 10.

The outer end of the chamber 52 is closed by a circular plate 54, and its inner end is also closed by a circular plate 55. However the plate 55 is formed with a circular section hole 56, FIG. 13, in which is received a jet or venturi nozzle 57. A cylindrical part 58 of the nozzle is secured in the hole 56, and extends to both sides thereof. At the side remote from the plate 54 the majority of the nozzle extends within the open channel defined between the chambers 52, 53, but an upper part of the nozzle projects upwardly out of the channel. The outer and inner surfaces of the nozzle are correspondingly tapered away from the plate 55. Within the open channel, a part-cylindrical element 59 is secured, the element extending along the whole length thereof and having its longitudinal sides terminating adjacent the upper surfaces of the open channel, as shown in FIG. 13. The lowest point of the upwardly facing surface of the element 59 is substantially at the level of the lowest outlet position of the nozzle so that, as will be described, air will leave the nozzle, in use, to provide an accelerated, material entraining, laminar flow to the outer chamber 53.

Figure 14:
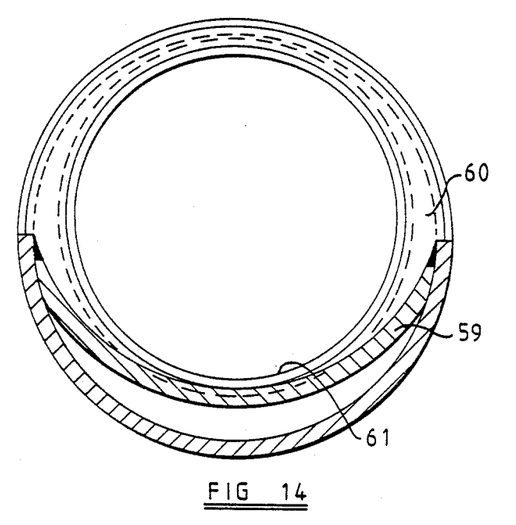
FIG. 14 is a sectional view on the line 14—14 of FIG. 10.

At the inner end of the chamber 53 is secured a circular plate 60 having a circular section hole 61 therein, the centre of the hole 61 lying on the same vertical line as the centre of the cylinder 51, but slightly above it, as shown in FIG. 14. Moreover the hole 61 is of smaller diameter than the cylinder 51. The lowest point of the hole 61 lies slightly above but substantially at the lowest point of the upwardly facing surface of the element 59. In the chamber 53 there is secured a further hollow cylinder 62 with its internally defined opening 63 exactly matching and thus forming a continuation of the hole 61. Finally the outer end of the chamber 53 has a circular plate 64 with a circular hole 65 forming a further continuation of the hole 61 and the opening 63.

Figure 10:
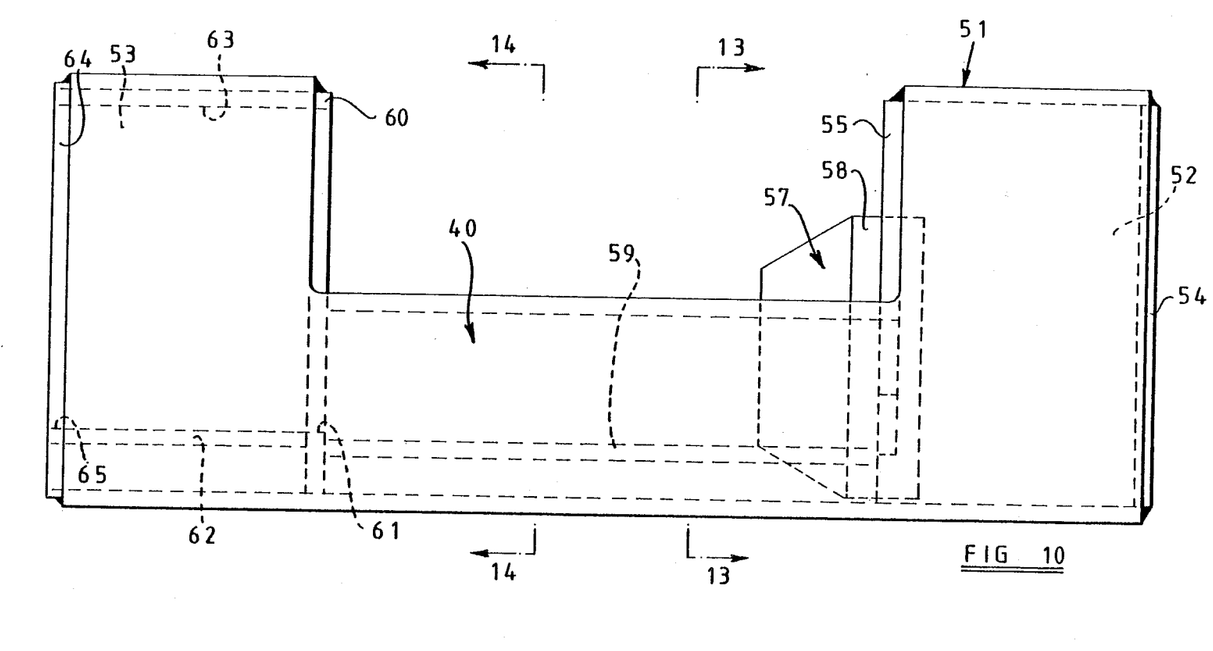
FIG. 10 is a side view of a venturi unit of the jet stower, on an enlarged scale.
Figure 11:
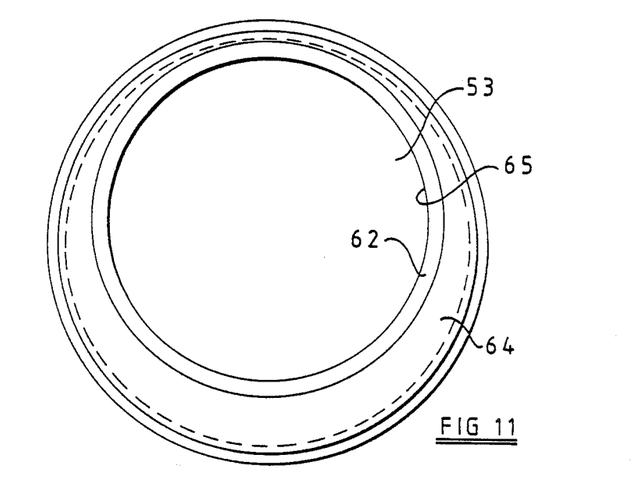
FIG. 11 is a view of one end of the unit of FIG. 10.
Figure 12:
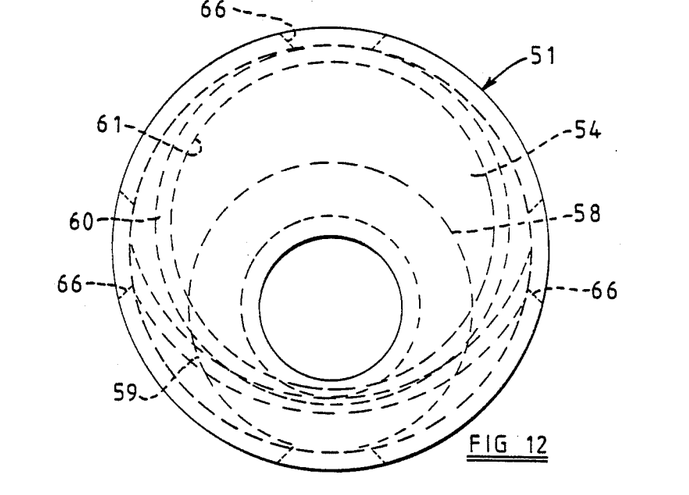
FIG. 12 is a view of the opposite end.

As shown in FIG. 12, but not in FIG. 10, the cylindrical wall of chamber 52 has a number of holes 66 therein to allow communication between the outside and the interior of the chamber.

In use, the unit 40 can be fitted in the stower casing in either of two alternative positions, depending upon the desired direction of filler material supply. As mentioned the unit 40 fits in the casing with the semicylindrical surface between the chambers 52, 53 being disposed between the bulkheads 22a, 22b. The chambers 52, 53 are a tight fit in the chambers 25, 26, with the chamber 52 fitting in chamber 25 and chamber 53 in chamber 26, or vice versa depending on the orientation of the unit 40 in the casing as will be explained. When in position, means, not shown, appropriately provided on the unit, prevent the unit rotating in the casing. In one example, the means could be a handle welded at an off-centre position to the rear of the plate 54, the handle extending into the outlet connection.

The operation of the jet stower will now be described.

As mentioned previously, filler material mined by the mining machine is transported by conveyor to the mineral sizer inlet 13. The material drops through the inlet and that which is larger than a predetermined size is broken between the teeth 17 and breaker plate 18. Material leaves the sizer through the outlet 11 and drops through the jet stower inlet opening 22.

As has been explained, the unit 40 can be employed to direct material entraining air through the pipe connection formed by the tubular part 36 and flange 37, or in the opposite direction through the pipe connection formed by the tubular part 49 and flange 50.

Firstly the operation will be described with material being transported through the part 36.

With the opening in the side 28 of the casing uncovered, the unit 40 shown in FIG. 10, is slid into the casing with the chamber 53 received in the air chamber 25 and the chamber 52 thus received in the air chamber 26. The tapered outlet of the nozzle 57 is thus directed towards the chamber 25. The opening in the side 28 which allows insertion of the unit 40 into the casing is then closed by the adaptor 43, with the lugs 41, 42 being received through the slots 45, 46 and pegs fitted in the holes 47, 48 to secure the plate 44 of the adaptor tightly against the side 28 to retain the unit 40 in place. The unit 40 is retained at the other side 27 of the casing by the plate 35 (FIG. 15).

Compressed air is supplied through the inlet connection 24 and passes along the passage 23 into the chambers 25 and 26, and also the further chamber 29. The air cannot directly pass from the chamber 25 into the solid walled chamber 53 of the unit 40, but it can and does pass from the chamber 26 through the holes 66 into the chamber 52. The air then passes through the chamber 52 into the nozzle 57 which acts as an air accelerating or venturi nozzle to accelerate the air and create a laminar flow in the open channel downstream thereof. This laminar flow receives and entrains filler material dropping through the stower inlet 22 and into the open channel.

The material is carried by the air flow through the chamber 53 and into an outlet pipe connected o the flange 37, which can direct the material to the required area of the mine.

If it is then wished to direct material to the opposite side of the stower, the following procedure is adopted. Firstly the compressed air and the material supply are each stopped. The adaptor 43 is then removed from the opening in the side 28 and the unit 40 removed from the casing. The unit 40 is then reversed and re-inserted into the casing so that the chamber 52 is received in the air chamber 25, and chamber 53 in air chamber 26. The adaptor is then replaced and an outlet pipe connected to its flange 50. In fact the outlet pipe could remain connected even when the flange does not serve as an outlet but merely prevents the unit coming out of the casing when the flow is in the opposite direction.

The flow of compressed air and material are then re-commenced and the air can now flow from the chamber 25 through the holes 66 into the chamber 52 and then as before through the nozzle 57 to form a material entraining stream, before entering the chamber 53. The material is then fed out through the outlet pipe on the flange 50.

Thus there is provided a convenient and effective means of changing the direction of material outlet from a jet stower. The change-over can be easily and quickly accomplished and access is required to only one side 28 of the stower in order to effect the reversal. Moreover the problem of large sized material blocking jet stower outlets is overcome by the use of an associated mineral sizer at the inlet to the stower.

Figure 16:
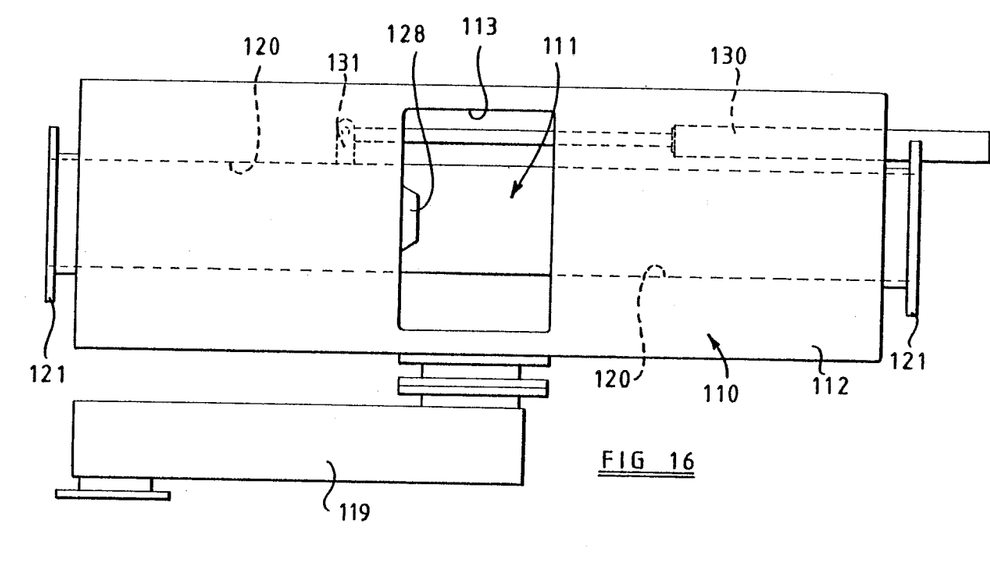
FIG. 16 is a schematic plan view of a jet stower of a second embodiment of the invention.
Figure 17:
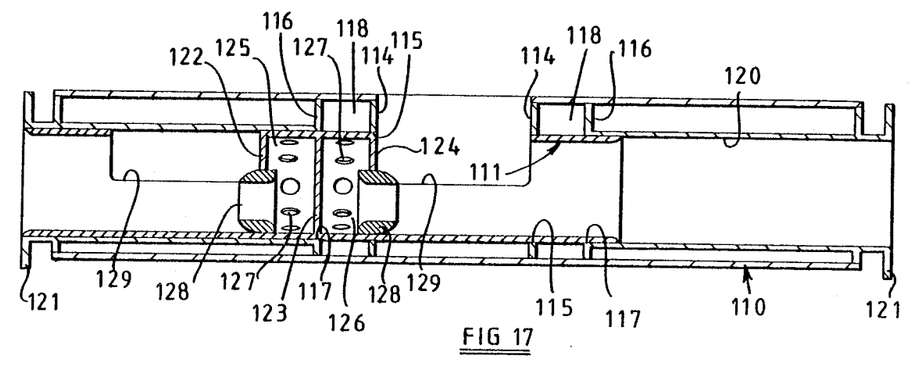
FIG. 17 is a longitudinal sectional view of the jet stower of FIG. 15.

FIGS. 16 and 17 show a second embodiment of the invention. The jet stower of this second embodiment of the invention is of similar form to that described and shown in FIGS. 1 to 15, having a casing part 110 in which is fitted a fluid accelerating unit 111.

The casing part 110 has a generally rectangular body portion 112 having a central rectangular material inlet opening 113 having transverse facing walls 114 each having a circular opening 115 therein. Spaced from each wall 114 away from the opening 113, but parallel thereto is a further transverse wall 116 also with a circular opening 117 therein, of the same diameter as the openings 115. Between each pair of walls 114, 116 is defined an air chamber 118 intended to be fed with compressed air via a passage 119, corresponding to the passage 23 in the jet stower of the first embodiment of the invention.

The openings 115, 117 are co-axial and extending from each of the walls 116 is a co-axial hollow cylindrical passage 120 also having the same internal diameter as the diameter of the openings 115, 117 in the walls 114, 116. The passage 120 terminates at each end in an external flange 121.

The unit 111 is of generally hollow cylindrical form and is a sliding fit in the passages 120 and in the openings 115, 117 in the walls 114, 116. At its centre the unit 111 has three spaced, parallel transverse walls 122-124 respectively which define hollow cylindrical chambers 125, 126 having circular holes 127 in the cylindrical walls thereof. In each outer wall, 122, 124 is secured a nozzle 128 which in each case is directed away from the centre wall 123, each nozzle being positioned so that its centre lies on a central vertical plane through the unit 111, but at the bottom part of the wall 122 or 124, so that it engages the inner surface of the unit. At each of the sides of the walls 122, 124 remote from the wall 123, the cylindrical wall of the unit 111 is cut away along approximately a quarter of its length, matching the width of the opening 113, and over approximately 180°, as shown at 129.

Extending longitudinally into the casing along one side of the unit 111 is a ram 130 which is connected to the unit 111 at 131. Extension or retraction of the ram thus pulls or pushes the unit along the passages 120 in the body portion 112.

FIGS. 16 and 17 show the unit in its extreme left position with the ram extended. In this position the air chamber 118 defined at the left side of the opening 113 feeds compressed air from the passage 119 through the holes 127 into the chamber 126. The compressed air passes through the nozzle 128 and leaves it as an accelerated, material entraining, laminar flow. Material dropping through the opening 113 is thus received in the unit through the cut away 129 and entrained in the air flow to be discharged into an outer pipe connected to the external flange 121 of the right hand passage 120.

If the ram is retracted, it pulls the unit to the right until the cut away 129 adjacent the wall 122 is aligned beneath the opening 113. In this position the chamber 125 is aligned with the air chamber 118 at the right hand side of the opening 113. Accordingly when compressed air is fed via the passage 119, it reaches both air chambers 118. However although the left hand chamber is now blocked by the cylindrical unit 111 (as is the right hand one in the position of FIGS. 16 and 17), the right hand chamber is in communication with the chamber 125 by way of the holes 127 therein and the air passes into the chamber 125 and out of the nozzle 128 to entrain material dropping through the opening 113. The only difference from the FIG. 17 operation is thus that the material is fed out of the stower at its opposite end.

Thus the outlet direction of the material can be changed easily merely by operation of the ram, which operation can be remotely controlled.

Figure 18:
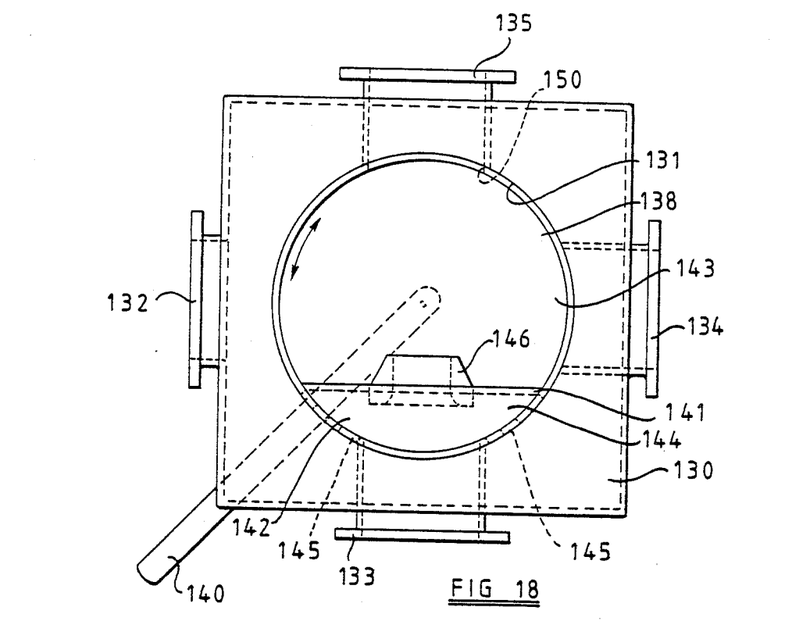
FIG. 18 is a schematic plan view of a jet stower of a third embodiment of the invention.
Figure 19:
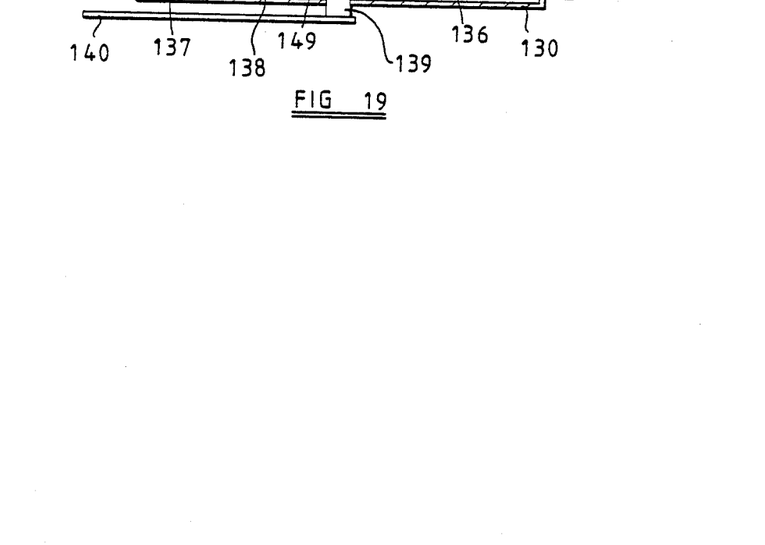
FIG. 19 is a sectional view of the jet stower of FIG. 18.

FIGS. 18 and 19 show another form of jet stower where the fluid accelerating unit can easily be positioned in alternative positions to direct material in different directions.

The stower has a box-like square casing 130 with a central circular opening 131 in its top surface. At the centre of one side it has an air inlet 132 and at the respective centres of the other three sides it has three air outlets 133-135, each of which project into the casing 130 and terminate in an arcuate end at the downwardly projected periphery of the circular opening 131.

Fitted in the casing is a fluid accelerating unit 136 which has a cylindrical wall 137 closed by a base 138. The base is mounted on a rotatable pivot 139 which passes through the bottom of the casing 130. A handle 140 can be provided to rotate the pivot 139 and thus the unit 136, as will be described. The unit 136 is shown only schematically in FIG. 18.

The cylindrical wall 137 has an internal diameter equal to the diameter of the opening 131 and its upper cylindrical edge lies just below the top surface of the casing, as shown in FIG. 19. Its base 138 is spaced above the bottom of the casing 130. The unit 136 is rotatable about its pivot 139 which is co-axial with the centre of the unit 136 and the centre of the opening 131. The ends of the outlets 133-135 contained in the casing sealingly engage the outer surface of wall 137.

The chamber within the cylindrical wall 137 is divided into two by means of a vertical wall 141, the division creating a small segment 142 and a larger segment 143. The segment 142 is closed by an upper wall 144. The part of the wall 137 forming the segment 142 is provided with two sets of holes 145, which sets are separated by a portion without holes which is of a length equal to the end of an outlet 133-135. The wall 141 has a central circular opening in which is fitted a nozzle 146 directed into the large segmental chamber 143. In the segment 143 is provided a guide 147 which has two downwardly converging straight sides 148, extending from opposite top edges of the wall 137, and an integral lowermost, radius part 149, the lower part of the outlet end of nozzle 146 being at the level of the part 149, as shown in FIG. 19.

In the wall 137 directly opposite to the nozzle outlet is a circular hole 150 matching the end of the outlets 133-135.

Accordingly in use, the unit 136 is rotated until the hole 150 is aligned with the end of a selected one of the outlets 133-135, which is thus then sealingly engaged with the wall 137. In this position the wall part between the sets of holes 145 is either engaged with the end of one of the two other outlets or is facing but spaced from the air inlet 132. In the example shown in FIG. 18, the hole 150 is aligned with the end of outlet 135 and the wall part between the sets of holes 145 is engaged with the end of the outlet 133.

In this state compressed air fed to the inlet 132 enters the casing 130 which forms an air chamber. It enters the sealed segment 142 through the holes 145 and passes out through the nozzle 146 which accelerates into a laminar flow which passes along the guide 147 entraining material dropping through the opening 131 and open top of the segment 143. The entrained material leaves the jet stower through the outlet 135.

By rotating the unit 136 clockwise by 90° or 180° from the FIG. 18 position, the material can be directed out of the outlet 134 or 133 as required. Thus again the direction of material fed out of the stower can be easily changed without having to disconnect pipes, and using a minimum of equipment.

Although a nozzle is disclosed in the embodiments described, other suitable means could be used instead in order to create the fluid flow necessary to transport the material to the selected stower outlet.

We claim:

1. A jet stower comprising a casing, material inlet means to the casing, at least two material outlets from the casing, fluid chamber means in the casing, a fluid inlet in the casing for supplying fluid to the fluid chamber means, a fluid accelerating unit in the casing, fluid accelerating means in said fluid accelerating unit, fluid inlet means in the fluid accelerating unit and upstream of said fluid accelerating means, material inlet means in the fluid accelerating unit and downstream of said fluid accelerating means, material outlet means in the fluid accelerating unit and downstream of said material inlet means of the unit, the fluid accelerating unit being positionable in the casing in either of at least two positions in each of which the material inlet means of the casing and the unit are aligned and in which fluid supplied, in use, to the fluid inlet of the casing is supplied to said fluid accelerating means of the fluid accelerating unit which produces a fluid flow across the material inlet means of the unit to entrain material passing thereinto, the entrained material being discharged from the casing at a selected one of its material outlets, depending on the selected position of the fluid accelerating unit in the casing.

2. A jet stower as claimed in claim 1, wherein said fluid accelerating unit has a fluid chamber, and a nozzle, constituting said fluid accelerating means, forms an outlet from said fluid chamber, the fluid chamber, in each of said alternative positions of the unit in the casing, being in communication with said fluid chamber means by way of said fluid inlet means of the unit.

3. A jet stower as claimed in claim 2, wherein the fluid chamber means includes two fluid distribution chambers, the fluid accelerating unit including a center section downstream of said fluid chamber and providing said material inlet means of the unit, and an end section downstream of the center section and providing said material outlet means of the unit, the unit being insertable in the casing in two alternative positions in which the fluid chamber of the unit communicates with a selected one of the two fluid distribution chambers so that fluid therefrom flows to the fluid chamber, is accelerated in passing through the nozzle, flows through the center section to entrain the material and out of the unit through said material outlet means of the end section which is itself received in the other fluid distribution chamber.

4. A jet stower as claimed in claim 3, wherein at least one of respective openings in outer walls of the two fluid distribution chambers can receive the fluid accelerating unit therethrough, the or each opening having, once the unit is positioned in the casing, secured therearound means to retain the unit in the casing, the means at the fluid distribution chamber containing the end section of the unit having an outlet pipe in communication with the outlet of the end section.

5. A jet stower as claimed in claim 4, wherein the unit is in the form of a hollow cylinder having a central semi-cylindrical portion removed to define said central section, the remaining hollow cylindrical portions at opposite ends of the central section defining said fluid chamber and said end section respectively.

6. A jet stower as claimed in claim 5, wherein the central section has a part-cylindrical element extending along its length and providing a surface substantially at the level of a lowest outlet portion of the nozzle.

7. A jet stower as claimed in claim 6, wherein the end section contains a hollow cylinder providing a lower inner surface substantially continuing the surface of the part-cylindrical element at the lowest outlet portion of the nozzle.

8. A jet stower as claimed in claim 5, wherein the fluid distribution chambers are each of rectangular form, lying parallel to one another and spaced apart by a casing portion defining said material inlet means, each fluid distribution chamber having an inner wall with an opening therethrough, the openings in both the inner and outer walls of both fluid distribution chambers being aligned and of the same size so that when received in the casing the fluid accelerating unit is carried by said inner and outer walls.

9. A jet stower as claimed in claim 8, wherein means are provided on the unit positively to prevent it rotating in the casing.

10. A jet stower as claimed in claim 1, wherein said fluid accelerating unit has two fluid chambers, and respective oppositely directed nozzles, each constituting said fluid accelerating means, form respective outlets from the fluid chambers, the unit being movable in the casing to two alternative positions, in which a selected one of the fluid chambers communicates with the fluid chamber means of the casing so that accelerated air flows in a selected direction in the casing, whilst the other fluid chamber is out of communication with the fluid chamber means.

11. A jet stower as claimed in claim 10, wherein the fluid accelerating unit is of hollow tubular form with a center portion formed by said two fluid chambers and separated from opposite end portions by respective cut-away portions, each of which define said material inlet means of the unit, the nozzles being directed into said cut-away portions respectively and said end portions providing said material outlet means of the unit, the fluid chamber means including two fluid distribution chambers and the unit being movable in the casing to two alternative positions in which one of the fluid chambers of the unit communicates with one of the fluid distribution chambers so that fluid therefrom flows to the fluid chamber, is accelerated by the nozzle of said one fluid chamber, flows through said adjacent cut-away portion and out of the unit through an adjacent one of the end portions of the unit, the other fluid chamber being out of communication with both fluid distribution chambers, the other of which receives said one of the end portions of the unit.

12. A jet stower as claimed in claim 11, wherein the unit has respective continuous surfaces extending at the levels of the lowest outlet portions of the nozzles.

13. A jet stower as claimed in claim 12, wherein the casing has a pair of passages extending from the fluid distribution chambers respectively to the ends of the casing, with the material inlet means being provided between said fluid distribution chambers, the unit being movable along said passages and through said fluid distribution chambers so that the material inlet means of the unit are aligned with the material inlet means of the casing in said two alternative positions respectively, the unit being carried by said passages and respective pairs of walls defining said fluid distribution chambers therebetween.

14. A jet stower as claimed in claim 13, wherein the unit is movable in the casing by means of a ram connected thereto.

15. A jet stower as claimed in claim 2, wherein the casing has a plurality of angularly spaced apart material outlets and the unit is rotatable in the casing to a plurality of positions where the material outlet means of the unit is aligned with a selected material outlet of the casing and the fluid chamber is in communication with the fluid chamber means of the casing.

16. A jet stower as claimed in claim 15, wherein the unit is of hollow cylindrical form being rotatable about a center axis, its cylindrical side wall having said fluid inlet means of the unit in said wall at a position diametrically opposed to the material outlet means of the unit.

17. A jet stower as claimed in claim 16, wherein the interior of the unit is divided into two segments by a transverse wall in which the nozzle of the fluid chamber is disposed, the segment forming the fluid chamber being enclosed by walls at opposite sides of the cylindrical unit, the other segment being open at one side forming said material inlet means to the unit which is in communication with the material inlet means of the casing.

18. A jet stower as claimed in claim 17, wherein a guide in the other segment provides a surface at the level of a lowest outlet portion of the nozzle, the surface extending from the nozzle to said material outlet means of the unit.

19. A jet stower as claimed in claim 18, wherein the casing is of box form having said fluid inlet in one side and material outlets in the remaining three sides respectively, the unit being rotatable sealingly to engage its outer surface with a material outlet, with its material outlet means aligned with the material outlet so engaged, to direct material entrained in said accelerated fluid out of the casing in the direction of the selected material outlet.

20. A jet stower as claimed in claim 19, wherein the fluid chamber means includes a single fluid distribution chamber within the casing permanently in communication with the fluid inlet means of the unit.

21. A jet stower as claimed in claim 16, wherein the unit is manually rotatable by means of a handle connected to a pivot on which the unit can rotate about said center axis.

* * * * *